(12) United States Patent
Cunningham (10) Patent No.: US 12,012,154 B2
(45) Date of Patent: Jun. 18, 2024

(54) HIDEAWAY HEADACHE RACK

(71) Applicant: THI CANADA, INC., Oakville (CA)

(72) Inventor: Michael Cunningham, Milton (CA)

(73) Assignee: Extang Corporation, Ann Arbor, MI (US)

(*) Notice: Subject to any disclaimer, the term of this patent is extended or adjusted under 35 U.S.C. 154(b) by 91 days.

(21) Appl. No.: 17/722,701

(22) Filed: Apr. 18, 2022

(65) Prior Publication Data

US 2023/0331314 A1 Oct. 19, 2023

(51) Int. Cl.
*B62D 33/02* (2006.01)

(52) U.S. Cl.
CPC .................. *B62D 33/0207* (2013.01)

(58) Field of Classification Search
CPC .................................. B62D 33/0207
See application file for complete search history.

(56) References Cited

U.S. PATENT DOCUMENTS

| | | | | |
|---|---|---|---|---|
| 3,891,262 A * | 6/1975 | Brunel | ............... | B60P 7/06 296/3 |
| 5,037,152 A | 8/1991 | Hendricks | | |
| 5,303,858 A * | 4/1994 | Price | ............... | B60P 3/1008 224/570 |
| 5,431,472 A * | 7/1995 | Coffland | ............... | B60R 9/00 296/10 |
| 5,439,152 A * | 8/1995 | Campbell | ............... | B60R 9/00 211/195 |
| 6,644,704 B1 | 11/2003 | Nyberg | | |
| 7,758,091 B1 * | 7/2010 | McCall | ............... | B60P 3/40 296/3 |
| 7,802,526 B2 * | 9/2010 | Brady | ............... | B65D 19/12 108/53.5 |
| 8,191,928 B2 * | 6/2012 | Hulscher | ............... | B66C 1/68 414/455 |
| 8,434,631 B2 * | 5/2013 | Harpole | ............... | B65D 85/66 211/195 |
| 9,132,784 B2 * | 9/2015 | Harrison | ............... | B60R 9/045 |
| 9,676,358 B2 * | 6/2017 | Schlup, Jr. | ............... | B60R 21/131 |
| 9,713,978 B2 | 7/2017 | Petru | | |
| 9,896,136 B2 * | 2/2018 | Corona | ............... | B62D 33/0207 |
| 10,131,287 B1 * | 11/2018 | Marino | ............... | B60R 9/045 |
| D840,906 S * | 2/2019 | Parzyck | ............... | D12/222 |
| 10,358,170 B2 | 7/2019 | Khatri et al. | | |
| D857,603 S * | 8/2019 | Mosingo | ............... | D12/222 |
| D857,604 S * | 8/2019 | Mosingo | ............... | D12/222 |
| D857,605 S * | 8/2019 | Mosingo | ............... | D12/222 |
| 10,414,369 B2 * | 9/2019 | Parzyck | ............... | B62D 33/0207 |
| 10,507,874 B2 * | 12/2019 | Crandall | ............... | B62D 33/0207 |
| 10,800,464 B2 * | 10/2020 | Binley | ............... | B60R 9/06 |

(Continued)

FOREIGN PATENT DOCUMENTS

CN 115195884 A * 10/2022 ............ B60J 7/1607

*Primary Examiner* — Justin M Larson (74) *Attorney, Agent, or Firm* — The Dobrusin Law Firm, P.C.

(57) ABSTRACT

A rack comprising: (a) a mounting bracket adapted to mount the rack to a cargo box of a vehicle; and (b) a rotary member in communication with the mounting bracket, wherein the rotary member rotates relative to the mounting bracket to move the rack between an extended position where the rack extends beyond a top edge of the cargo box and a stowed position where the rack in positioned within the cargo box below the top edge.

22 Claims, 5 Drawing Sheets

(56) References Cited

U.S. PATENT DOCUMENTS

| | | | |
|---|---|---|---|
| 11,034,307 B1* | 6/2021 | Cunningham | B60R 9/06 |
| 2004/0134953 A1* | 7/2004 | Perez | B60P 3/40 |
| | | | 224/403 |
| 2008/0129067 A1 | 6/2008 | Rios | |
| 2011/0108590 A1 | 5/2011 | Kennedy et al. | |
| 2014/0197653 A1 | 7/2014 | Stepanians | |
| 2017/0313234 A1* | 11/2017 | Petru | B60P 1/00 |
| 2017/0361877 A1 | 12/2017 | Corona | |
| 2019/0210663 A1* | 7/2019 | Binley | B60P 3/40 |
| 2020/0398906 A1* | 12/2020 | Binley | B60R 9/08 |
| 2021/0078644 A1* | 3/2021 | Farren | B60Q 1/30 |
| 2023/0331314 A1* | 10/2023 | Cunningham | B62D 33/0207 |

\* cited by examiner

HIDEAWAY HEADACHE RACK

FIELD

The present teachings generally relate to a vehicle rack, and more particularly, to a hideaway vehicle rack with tonneau cover integration.

BACKGROUND

Vehicle accessories, and particularly, accessories for vehicles having a cargo box, have become increasingly prominent. Often times vehicles having a cargo box, such as a pickup truck, will have one or more accessories fixed directly to a portion of the cargo box. The accessories may be fixed within the confines of the vehicle, may be secured along walls defining the cargo box, or both. For example, a headache rack may be disposed across a width of the cargo box and secured along a top edge of the cargo box by one or more brackets. The headache rack may be positioned behind a cab of the vehicle and be capable of bearing a load to protect a passenger within the cabin or help secure one or more items within the cargo box. It should be noted that many accessories may be secured to the cargo box, such as a toolbox, tonneau cover, cargo net, step, tie down connectors, or a combination thereof.

Conventional attachment mechanisms to secure the accessories to the cargo box often require permanent modification to the cargo box. For example, a top edge and/or a panel of the cargo box may be refabricated to permanently mount the accessories. One or more brackets may be drilled, welded, or otherwise secured to the top edge and/or the panel of the cargo box. As a result, if an accessory is ever to be removed, the cargo box may have permanent deformation or holes, leaving an aesthetically displeasing surface, risk of degradation to the cargo box or interior of the vehicle, or both. Additionally, refabricating of the cargo box may require an extensive amount of time and/or money and may often need to be completed by a professional in the industry. Furthermore, by mounting an accessory such as a rack along a top edge of the cargo box, a user may be unable to utilize additional accessories, such as a tonneau cover, due to the mounting of the rack interfering with mounting of the tonneau cover. As a result, a user may be unable to secure and/or cover items within the cargo box while a rack or other accessory is attached to the cargo box.

Thus, given the aforementioned issues, there remains a need for a mounting mechanism to securely mount an accessory such as a rack to a cargo box of a vehicle. What is needed is a rack secured to a portion of a cargo box to prevent movement, rattling, vibration, or a combination thereof of the rack during operation of the vehicle. There also remains a need for a bracket to mount the rack without requiring refabricating of the cargo box. Therefore, what is needed is a bracket that may mount directly to existing features of the cargo box. Additionally, there remains a need for a rack that may quickly and easily attach to a cargo box of a vehicle and allow for movement of the rack. Accordingly, what is needed is a rack that may be mounted to a cargo box in a moveable manner to allow for use of additional accessories, such as a tonneau cover, while the rack is mounted.

SUMMARY

The present teachings meet one or more of the present needs by providing a rack comprising: (a) a mounting bracket adapted to mount the rack to a cargo box of a vehicle; and (b) a rotary member in communication with the mounting bracket, wherein the rotary member rotates relative to the mounting bracket to move the rack between an extended position where the rack extends beyond a top edge of the cargo box and a stowed position where the rack in positioned within the cargo box below the top edge.

The mounting bracket may be adapted to mount the rack to an inner panel of the cargo box below the top edge. A barrel may extend between the rotary member and a sleeve of the mounting bracket, and a bearing with the sleeve may allow for rotation of the barrel and the rotary member relative to the sleeve. The sleeve may be at least partially supported by a support extending from a mounting plate of the mounting bracket. Furthermore, the barrel may be secured within the sleeve of the mounting bracket, extend through the rotary bracket, and extend into the rotary member. Similarly, the rotary member and the barrel may rotate about a longitudinal axis of the barrel.

Additionally, a rotary bracket may abut the rotary member and rotation of the rotary member may move the rotary bracket. The rotary bracket may include a connecting portion secured to the rotary member and a mating portion that is guided along a mounting plate of the mounting bracket. Moreover, the mating portion may be moved between rotary bracket mounting holes located on the mounting plate so that a fastener may extend through the mating portion into one of the rotary bracket mounting holes to secure the rack. Similarly, a first rotary mounting hole corresponds to the stowed position of the rack and a second rotary bracket mounting hole corresponds to the extended position of the rack. Furthermore, the mating portion of the rotary bracket may abut a tab of the mounting plate when the rack is in the extended position.

Moreover, the mounting bracket may include a mounting plate that is adapted to abut the inner panel of the cargo box so that a fastener may extend through the mounting plate and into the inner panel. The mounting bracket may be free of contact with a stake pocket located along the top edge of the cargo box. Thus, the rack may be adapted to be in the extended position while a tonneau cover remains secured to the top edge of the cargo box.

Furthermore, when the rack is in the stowed position, the rack may be positioned within the cargo box so that a tonneau cover may be disposed over the cargo box along the top edge. Additionally, the mounting plate may include an extension that supports a portion of the rack when in the stowed position. A bumper along the extension may contact a portion of the rack when in the stowed position. For example, the rack may include one or more uprights extending from the rotary member, and the one or more uprights may connect to one or more crossmembers. As such, the one or more uprights, the one or more crossmembers, or a combination thereof may be supported by the extension in the stowed position.

Additionally, the rotary member may extend between, and may be secured to, opposing mounting brackets adapted to mount the rack to opposing inner panels of the cargo box so that the rack is positioned near a cab of the vehicle The present teachings may also meet one or more of the present needs by providing: a mounting mechanism to securely mount an accessory such as a rack to a cargo box of a vehicle; a rack secured to a portion of a cargo box to prevent movement, rattling, vibration, or a combination thereof of the rack during operation of the vehicle; a bracket to mount the rack without requiring refabricating of the cargo box; a bracket that may mount directly to existing features of the cargo box; a rack that may quickly and easily attach to a cargo box of a vehicle and allow for movement of the rack; and a rack that may be mounted to a cargo box in a moveable manner to allow for use of additional accessories, such as a tonneau cover, while the rack is mounted; or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference herein in their entirety for all purposes. Other combinations are also possible as will be gleaned from the following claims, which are also hereby incorporated by reference into this written description.

The present teachings generally relate to accessories of a vehicle. More particularly, the present teachings may generally relate to an accessory, such as a vehicle rack, adapted for communication with cargo box of a vehicle However, while a vehicle rack is describe for illustrative purposes, the mounting methodology and structure described herein to mount the vehicle rack may also be adapted for mounting various other accessories, such as a toolbox, tool rack, tonneau cover, roll bar, secondary lighting, other accessories, or a combination thereof. As such, it may be gleaned from the present teachings that the features herein may not be limited to just a vehicle rack.

The cargo box may be defined by one or more walls, panels, sides, or a combination thereof forming an inner portion of the cargo box. The inner portion may be used to store one or more items, transport one or more items, or a combination thereof. The walls, panels, sides, or a combination thereof of the cargo box may extend from a supporting surface of the inner portion of the cargo box and may terminate at a top. The walls may be formed from one or more panels. For example, each wall of the cargo box may be formed from an outer fender of the vehicle and an inner panel. The walls may be at least partially hollow, may include one or more attaching features, or both. For example, the walls may include a tie-down mount, clip, receiving feature, fastener, hook, hole, nut, or a combination thereof.

The cargo box may also include one or more stake pockets. The stake pockets may generally be positioned along a top edge of the cargo box, such as along a top edge of the walls defining the cargo box. However, it is envisioned that the stake pockets may be positioned anywhere along the cargo box other than just the top edge of the cargo box. The stake pockets may generally function to receive a structure to secure the structure to the cargo box. For example, the stake pockets may generally be utilized to hold a stake in a desired position to build a sidewall to help keep cargo contained within the cargo box. However, it is envisioned that the teachings herein may provide a means of mounting a vehicle rack or other accessory free of intrusion within the stake pockets. That is, the stake pockets may advantageously be utilized for secondary accessories used in conjunction with the vehicle rack or other accessory as described herein. For example, the vehicle rack or other accessory described herein may be mounted along one or more inner panels of the cargo box free of interference with the stake pockets. As a result, the top edge of the cargo box may remain unobstructed from the vehicle rack or other accessory.

It is envisioned that one or more mounting brackets may secure an accessory directly or indirectly to the cargo box. Such mounting brackets may function to secure the vehicle rack described herein to the cargo box. To do so, the mounting brackets may be positioned anywhere along the cargo box based on a desired mounting location of the vehicle rack. For example, the mounting brackets may be secured to the inner panels of the cargo box, the supporting surface within the inside of the cargo box, a fender near the cargo box, an edge of the cargo box, or a combination thereof, However, as discussed above, the mounting brackets may secure any accessory to the cargo box and are not limited to just a rack, such as a headache rack of a vehicle. The accessory may be, but is not limited to, a headache rack, toolbox, bed extension, cargo net, cargo divider, tonneau cover, other accessory, or a combination thereof. The present teachings may provide a mounting mechanism for any accessory, such as those designed by the original equipment manufacturer (OEM), from secondary aftermarket manufacturers, or both. While specific mounting techniques may be described herein, the brackets utilized may be configured for a variety of configurations and positions. Thus, the present teachings beneficially provide a mounting structure with increased tunability and customization when compared to conventional mounting techniques.

A single mounting bracket may be utilized to mount the rack to the cargo box. Alternatively, a plurality of mounting brackets may be used to mount the rack to the cargo box. For example, a passenger side mounting bracket and a driver side mounting bracket may be positioned on opposing sides of the cargo (i.e., on a passenger side and a driver side, respectively) so that the rack may be disposed across a width of the cargo box.

The mounting bracket may be recessed from a top edge of the cargo box such that, when the bracket is mounted, a tonneau cover may still be disposed over the cargo box and used in conjunction with the rack. In particular, it is envisioned that the rack when secured using the mounting bracket may move between an extended position and a stowed position and may include moving to one or more positions therebetween. The extended position may be defined as a position where the rack extends beyond or above a top edge of the cargo box to be positioned adjacent to a cab of the vehicle, thereby protecting occupants within the vehicle from obstructions, thereby allowing for items to be secured to the rack, or both. Conversely, a stowed position may be defined as a position where the rack is folded downward into the cargo box and recessed from a top edge of the cargo box. Advantageously, while in the stowed position, a tonneau cover may be disposed across the top edge of the cargo box to cover and secure the rack within the cargo box along with any additional items located therein.

Similarly, the present teachings also envision that the rack may be located in the extended position while the tonneau cover remains at least partially closed. For example, the tonneau cover may include one or more foldable panels so that only a front panel located closest to the cab of the vehicle may be folded to an open position to allow for the rack to protrude from the cargo box. As a result, the tonneau cover may still secure items within the cargo box and remain closed beyond the opening allowing the rack to extend beyond the cargo box. Thus, a person may be unable to access the inside of the cargo box even when the rack is in the extended position. Additionally, it should be noted that such configurations may also be possible with other tonneau covers beyond foldable tonneau covers as described above. For example, a rollable tonneau cover, soft-shell tonneau cover, hard slat tonneau cover, or a combination thereof may also be utilized with the rack and mounting bracket as described herein.

As mentioned above, the mounting bracket may be particularly beneficial in mounting a rack, such as a headache rack, to a cargo box of a vehicle. While it is not intended that the rack may be limited to any specific design, it is envisioned that the rack may include one or more uprights, one or more crossmembers, or a combination thereof. As such, a shape of the rack may be defined by the connection between the uprights and the crossmembers. The uprights may extend substantially orthogonal to a floor of the cargo box while the crossmembers may extend substantially laterally to the crossmembers. However, the uprights and the crossmembers are not limited to any such angle. Thus, it may be gleaned that various types of racks may be utilized with the mounting brackets described herein.

The rack may also include a rotary member. The rotary member may function to connect the rack to the mounting bracket, either directly or indirectly. The rotary member may function to rotate relative to the mounting bracket to move the rack between the stowed position and the extended position, or vice versa, while the mounting bracket remains stationary. The rotary member may extend between opposing mounting brackets. The rotary member may be a crossmember, a tube, a solid member, or a combination thereof. The rotary member may extend at any angle relative to the mounting bracket. However, it is envisioned that the rotary member may extend substantially laterally across the cargo box between opposing inside panels of the cargo when the rack is mounted within the cargo box. As such, the rotary member may have a length less than a width across the cargo box, the width being defined as a distance between opposing inner panels of the cargo box.

Additionally, the uprights, the crossmembers, or both may extend from the rotary member. As a result, rotation of the rotary member may result in movement of the remaining portions of the rack. That is, rotation of the rotary member may move the uprights, the crossmembers, or both of the rack.

The rotary member may be connected to the mounting bracket by a barrel. The barrel may function as a connector securing the rotary member to the mounting bracket in a moveable manner. That is, the barrel may allow for rotation of the rotary member while the mounting bracket remained stationary. The barrel may extend into a cavity of the rotary member. For example, the barrel may create a friction fit with the rotary member so that rotation of the barrel causes rotation of the rotary member, or vice versa. However, various connections may be made between the rotary member and the barrel to create similar movement.

Conversely, the barrel may be connected to the mounting bracket so that the barrel may be able to freely rotate relative to the mounting bracket. To do so, the barrel may be seated within a sleeve of the mounting bracket. The sleeve may be hollow and at least partially encompass the barrel to connect the barrel and thus the rotary member to the mounting bracket. To facilitate rotation, a bearing may be positioned within the sleeve in communication with the barrel to allow for rotation of the barrel within the sleeve. However, in lieu of a bearing, lubricants may be incorporated to allow for rotation of the barrel within the sleeve. Additionally, it should be noted the present teachings are not intended to limit the sleeve to a specific shape or dimensions. As such, any sleeve providing one or more of the aforementioned features may be utilized.

The sleeve may extend or protrude from a mounting plate of the mounting bracket. The mounting plate may function to mate with a surface of the cargo box. In particular, the mounting plate may abut an inner panel of the cargo box so that one or more fasteners may extend through the mounting plate and into the inner panel, thereby securing the rack to the cargo box. The mounting plate may include one or more bends, undulations, curves, cutouts, flat portions, or a combination thereof to mate with a contour of the surface of the inner panel. However, no particular shape may be required, and such contouring of the mounting plate may vary depending on the vehicle. Thus, the mounting brackets may advantageously be adapted for a number of different vehicles, thereby providing a more universal accessory mounting scheme.

Additionally, the mounting plate may include one or more holes to receive one or more fasteners. As a result, the fasteners may extend through the holes into the inner panel or other portion of the cargo box to secure the mounting bracket and thus the rack to the cargo box.

Furthermore, the mounting plate may also include one or more supports projecting from the mounting plate and a desired angle to at least partially support the sleeve of the mounting bracket. That is, the supports may at least partially alleviate stress on the sleeve when the barrel and rotary member of the rack are connected to the sleeve. Thus, the support may be a portion of the mounting plate the extends away from the mounting plate to engage a portion of the sleeve.

As described above, the rotary member of the rack in communication with the sleeve may allow for rotation of the rack between the extended position and the stowed position. To secure the rack in a desired position such as the extended position and/or the stowed position, a rotary bracket may be connected to the rotary member, the barrel, or both.

The rotary bracket may function to move as the barrel and the rotary member rotate. As such, the rotary bracket may act as an extension of the rotary member and/or barrel adapted to communicate with the mounting plate of the mounting bracket. The rotary bracket may be secured to the barrel, the rotary member, or both. For example, the barrel may extend through or be otherwise formed with the rotary bracket to ensure movement of the rotary bracket based on rotation of the barrel. Similarly, the rotary bracket may engage the barrel with one or more anti-rotation features to ensure that the rotary bracket is prevented from rotating freely relative to the barrel and/or the rotary member.

While the rotary bracket may be positioned anywhere along the barrel, it is envisioned that the rotary bracket may be located adjacent to the rotary member. For example, the rotary bracket may include a connecting portion the engages the barrel and/or the rotary member to ensure the movement of the rotary bracket described above. As such, the connecting member may include one or more holes to receive the barrel, to secure the rotary bracket to the barrel via one or more fasteners, or both. However, various connection means may be utilized.

The rotary bracket may also include a mating portion. While the connecting portion may engage the barrel and/or the rotary member, the mating portion may function to communicate with the mounting bracket. For example, the mating portion may be guided along or near the mounting plate so that the rotary bracket moved to one or more desired positioned relative to the mounting plate when the rack is moved between the engaged position and the extended position, including one or more positions therebetween. As a result, the mating portion may align with a feature of the mounting plate to ensure the rack is in the desired position. For example, the mounting plate may include one or more features that correspond to the one or more desired positions of the rack. The one or more features may be a hole to receive a fastener extending through the mating portion to connect the mating portion to the mounting plate. Thus, the mating portion may be secured to the mounting plate so that the rack is secured in the desired position. Beneficially, the mating portion may then be easily disconnected from the mounting plate (i.e., by removal of a fastener) to allow for quick and easy movement of the rack to another desired position. Once the desired position is reached, the mating portion may then again be connected to the mounting plate (i.e., by inserting the fastener through the mating portion into the mounting plate). While alignment of the mating portion with a hole of the mounting plate is described herein (e.g., a hole of the mating portion may align with a hole of the mounting plate when the rack is in a desired position such as the extended position and/or the stowed position), any feature of the mounting plate may correspond to a position of the rack. For example, another mechanical connection such as a keying mechanism, snap-fit, hook, locking mechanism, latching mechanism, or a combination thereof may also be incorporated.

Additionally, it should be noted that the mounting bracket may also include one or more additional features to help support the rack when in the designated positions. For example, the mounting bracket may include an extension that projects away from the mounting plate. The extension may function to support a portion of the rack when the rack is in a stowed position, an extended position, or both. In particular, the extension may provide a support surface so that a portion of the rack, such as a crossmember, an upright, or both, rests upon the support to alleviate stress on the connection between the rotary bracket and the mounting plate. As such, the extension may support a portion of the weight of the rack to ensure the position of the rack.

Similarly, the ensure proper support of the rack, the extension may include a bumper. The bumper may function as cushion for the rack when engaging the extension to prevent damage or unwanted rattling of the rack when supported by the extension. The bumper may be any desired material and secured in any fashion to the extension. However, it is envisioned that the bumper may be a compressive material, such as a foam, that compresses at least partially to cushion the rack when engaging the extension of the mounting bracket.

The mounting bracket may also include a tab. While the extension as discussed above may support a portion of the rack in a desired position, such as the stowed position, the tab may function to engage a portion of the rack when in a desired position, such as the extended position. For example, the tab may be a finger, bend, projection other feature, or a combination thereof along the mounting plate of the bracket. Such a feature may engage a portion of the rotary bracket when the rack is in the extended position to prevent overextension of the rack beyond the designated position. Similarly, the tab may also help at least partially alleviate weight on the connection between the rotary bracket and the mounting plate, may provide a safety stop to prevent accidental overextension when a connection between the rotary bracket and the mounting plate fails, or both. As such, it may be gleaned that the tab may be positioned anywhere along the mounting plate to communicate with the rotary bracket.

Figure 1:
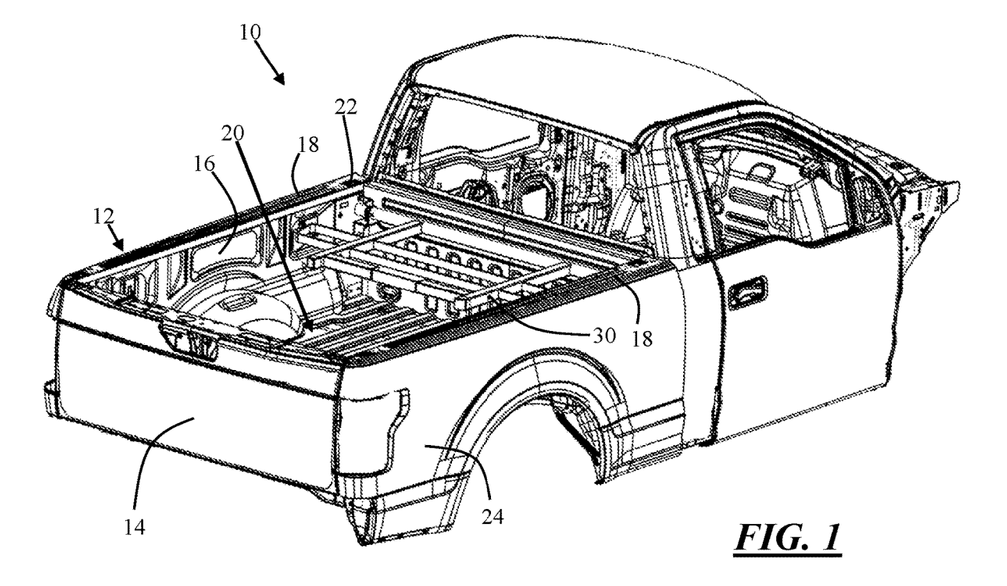
FIG. 1 is a perspective view of a rack secured to a cargo box of a vehicle in a stowed position.

Turning now to the figures, FIG. 1 illustrates a perspective view of a vehicle 10. The vehicle 10 may include a cargo box 12. An inside 20 of the cargo box 12 may be enclosed by one or more inner panels 16 of the cargo box, a tailgate 14, or both. The inner panels 16, the tailgate 14, or both may form walls of the cargo box 12. The walls at least partially formed by the inner panels 16 may also include a top edge 18 having a stake pocket 22 therein, the top edge 18 extending at least partially around a perimeter of the cargo box 12. The top edge 18 may be defined by a thickness of the walls forming the cargo box 12, a thickness of the inner panels 16, or both. For example, the inner panels 16 may be secured or connected to an outer fender 28 of the cargo box 12. As such, the top edge 18 may at least partially connect the inner panel 16 to the outer fender 28.

A rack 30 may be secured along the cargo box 12 via one or more brackets (see FIGS. 4-7). As shown, the rack 30 may be secured to one or more inner panels 16 of the cargo box 12 so that that rack 30 is positioned adjacent to a cab of the vehicle. Advantageously, as discussed in further detail below, the rack 30 may be movable between a stowed position and an extended position. The stowed position, as shown in FIG. 1, may be a position of the rack 30 whereby the rack 30 is contained within the confines of the cargo box 20. That is, the rack 30 may be recessed and/or below the top edge 18 of the cargo box 12 such that a tonneau cover may extend over the rack 30 while in the stowed position (see FIG. 2).

Figure 2:
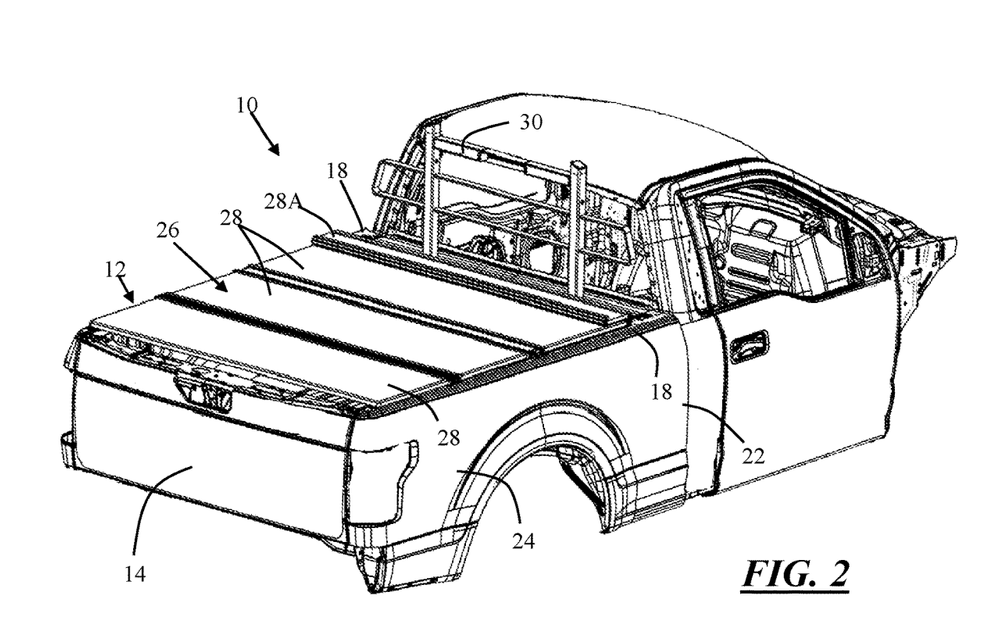
FIG. 2 is a perspective view of a rack secured to a cargo box of a vehicle in an extended position.

FIG. 2 illustrates a perspective view of a vehicle 10 having a cargo box 12. As discussed above, an inside of the cargo box 12 may be enclosed one or more inner panels (not shown), a tailgate 14, or both. Moreover, the walls at least partially formed by the inner panels 16 may include a top edge 18 extending at least partially around a perimeter of the cargo box 12. The top edge 18 may also extend between the one or more inner panels and one or more fenders 24.

Additionally, the cargo box 12 may include a tonneau cover 26 disposed along the top edge 18 to enclose the inside of the cargo box 12. For illustrative purposes, the tonneau cover 26 may include a plurality of foldable panels 28 that may fold relative to each other. However, it should be noted that other types of tonneau covers may be used with the teachings herein.

The vehicle 10 may also include a rack 30 secured within the cargo box 12 (see FIG. 1). As shown, the rack 30 may be in an extended position, whereby the rack 30 extends beyond a top edge 18 of the cargo box 12 adjacent to a cab of the vehicle 10. Advantageously, the rack 30 may be adapted to move to the extended position without the removal of the tonneau cover 26. That is, the tonneau cover 26 may include a front panel 28A adapted to fold and open a portion of the cargo box 12 to allow the rack 30 to stay in the extended position. In doing so, the tonneau cover 26 may beneficially still provide a cover over the cargo box 12 to ensure any items located within the cargo box 12 are secured, to prevent debris and/or moisture from entering substantially all of the cargo box 12, or both while still allowing use of the rack 30. Thus, it is envisioned that the front panel 28A may provide an opening sufficient for the rack 30 to extend outside of the cargo box 12 yet prevent unwanted intrusion or access to the remaining portion of the cargo box 12.

Additionally, given that the rack 30 may move between the extended position and a stowed position (see FIG. 1), the rack 30 may be secured to the cargo box 12 in the stowed position to facilitate the tonneau cover 26 being fully closed. That is, due to the rack 30 being mounted to inner panels of the cargo box 12 instead of conventional mounting within stake pockets 22 along the top edge 18, the tonneau cover 26 may be fully extended along the top edge 18, include the front panel 28A, to enclose the cargo box 12 and the rack 30 therein.

Figure 3:
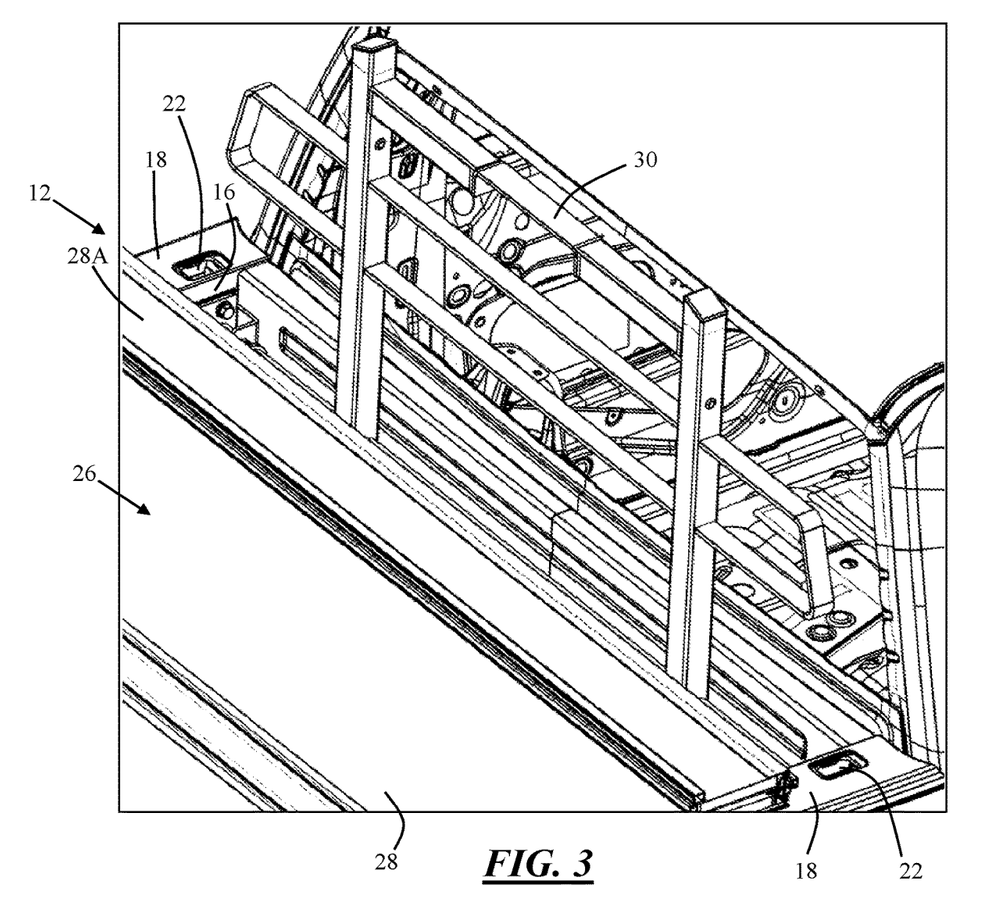
FIG. 3 is a close-up view of the rack of FIG. 2.

FIG. 3 illustrates a close-up view of the rack 30 shown in FIG. 2. As shown in FIG. 3, the rack 30 may move between a stowed position (FIG. 1) and an extended position. In the extended position, the rack 30 may protrude from the inside of the cargo box 12 beyond a top edge 18 of the cargo box 12. Advantageously, due to the mounting of the rack 30 not requiring the stake pockets 22 located along the top edge 18, the rack 30 may be stowed within the cargo box 12 beneath a tonneau cover 26 covering the cargo box 12. Similarly, without removing the tonneau cover 26, one or more panels 28, such as a front panel 28A located adjacent to the cab or the vehicle, may be folded open to allow the rack 30 to be secured within the extended position. As such, a user may beneficially use the tonneau cover 26 and the rack 30 simultaneously.

Figure 4:
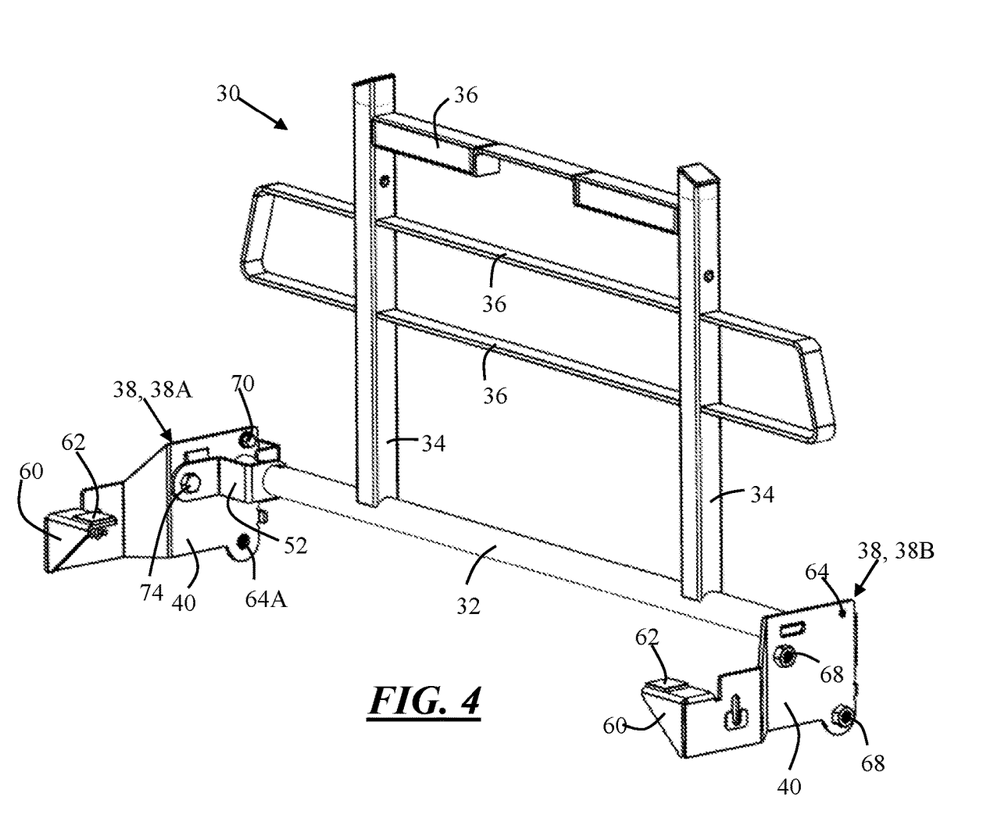
FIG. 4 is a perspective view of a rack in accordance with the present teachings.

FIG. 4 illustrates a perspective view of a rack 30 in accordance with the present teachings. The rack 30 may include one or more uprights 34 and one or more connected crossmembers 36. The uprights 34 and/or the crossmembers 36 may be adapted to secure one or more accessories (e.g., tools, construction equipment, recreational equipment, etc.) to the rack 30. Additionally, the rack 30 may act as a headache rack for a cab of a vehicle, whereby the uprights 34 and the crossmembers 36 may prevent items or debris from entering the cab of the vehicle and causing injury to one or more occupants.

The rack 30 may be mounted to a cargo box of a vehicle using one or more mounting brackets 38. For example, the rack 30 may include a driver side mounting bracket 38A and a passenger side mounting bracket 38B so that the rack 30 may mount to opposing sides of a cargo box and extend therebetween (See FIGS. 1-3). To secure the rack 30, a plurality of fasteners 70 may extend through mounting holes 64 along a mounting plate 40 of each mounting bracket 38 into inner panels of the cargo box of a vehicle.

The rack 30 may also be adapted to move between an extended position as shown to a stowed position in which a portion of the rack 30 (e.g., the uprights 34, the crossmembers 36, or both) may rest on an extension 60 of the mounting brackets 38. For example, the extension 60 may include a bumper 62 to provide a padded stop for the rack 30 when reaching the stowed position. To facilitate such movement between the extended position and the stowed position, the rack 30 may include a rotary member 32 secured to a rotary bracket 52 in communication with each mounting bracket 38.

Figure 5:
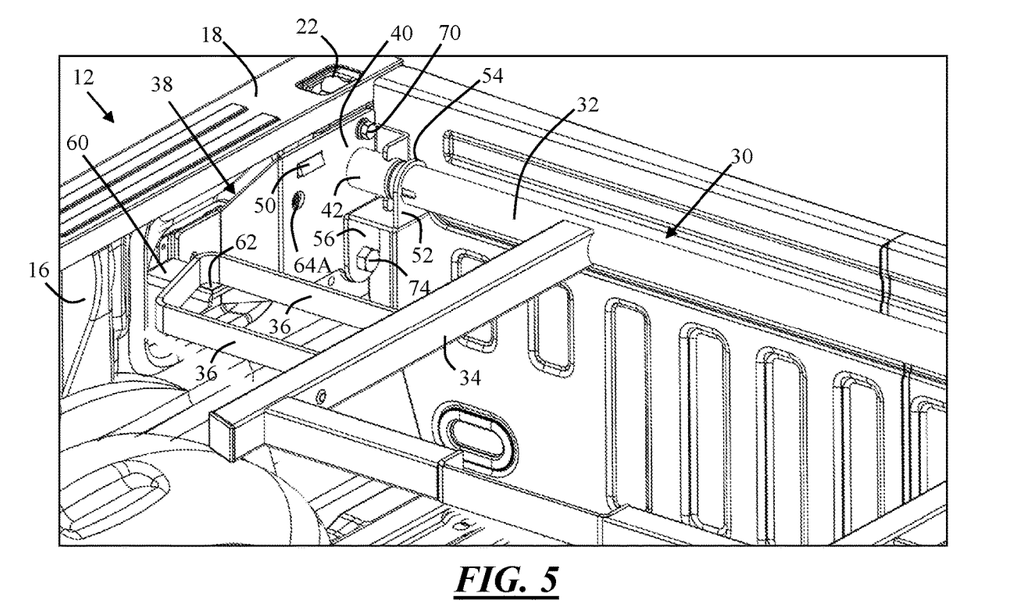
FIG. 5 is a perspective view of a rack in a stowed position.
Figure 6:
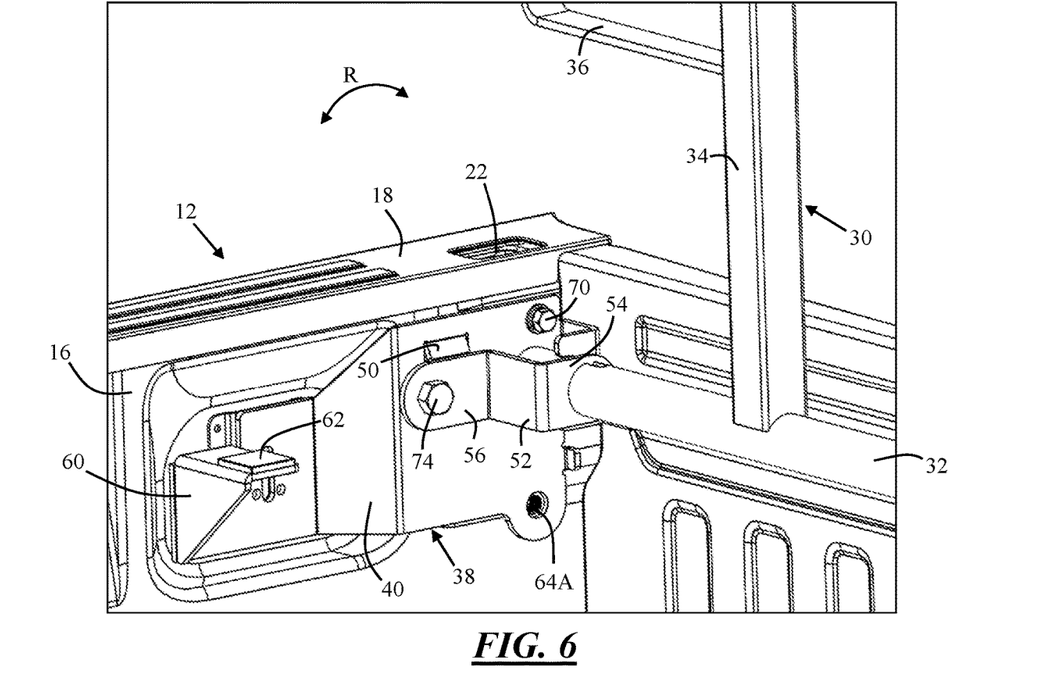
FIG. 6 is a perspective view of a rack in an extended position.

The rotary bracket 52 may be adapted to rotate with the rotary member 32, and thus the rack 30, between the extended position and the stowed position, or one or more positions therebetween. In doing so, the rotary bracket 52 may align with rotary bracket mounting holes 64A within the mounting plate 40 of the mounting bracket 38 when in the stowed position or the extended position. As a result, the rotary bracket 52 may then be secured in the stowed position or the extended position by extending a fastener 74 through the rotary bracket 52 and into the rotary bracket mounting hole 64A. Thus, the rack 30 may beneficially be moved between the stowed position and the extended position by simply removing the rotary bracket fastener 74, rotating the rack 30 to the desired position, and resecuring the rotary bracket fastener 74 into the associated rotary bracket mounting hole 64A. Additionally, it should be noted that the rotary bracket fastener 74 may be any securing means. For example, while a bolt is shown as the fastener 74, other types of fasteners may be utilized, such as a pin (e.g., a spring-loaded pin), FIGS. 5 and 6 illustrate a rack 30 in a stowed position and an extended position, respectively, as discussed above. The rack 30 may be configured to mount within a cargo box 12 of a vehicle. The cargo box 12 may be defined by one or more inner panels 16 partially enclosed an inside of the cargo box 12. A top edge 18 of the cargo box 12 may extend at least partially around an upper perimeter of the cargo box 12 along a top of the inner panels 16.

As described herein, the rack 30 may be mounted to the inner panels 16 of the cargo box 12 by one or more mounting brackets 38. That is, the mounting bracket 38 may include a mounting plate 40 that abuts the inner panel 16 so that one or more fasteners 70 may extend through the mounting plate 40 and into the inner panel 16. Advantageously, mounting brackets 38 may facilitate mounting the rack 30 within the confines of the cargo box 12 recessed from the top edge 18 of the cargo box 12 so that a tonneau cover may disposed over the rack 30 along the top edge 18 when the rack 30 is in the stowed position, as shown in FIG. 5. Such functionality may advantageously allow for the rack 30 to be mounted to the cargo box 12 with additional accessories, such as a tonneau cover (not shown), as opposed to a conventional mounted rack that utilize mounting within stake pockets 22 located along the top edge 18.

To allow for rotation between an extended position and the stowed position, the rack 30 may include a rotary bracket 52 attached to a rotary member 32 of the rack 30. The rotary bracket 52 may include connecting portion 54 that connects to the rotary member 32 and a mating portion 56. The mating portion 56 may be configured to mate to the mounting plate 40 and secure the rack 30 in the extended position and/or the stowed position. To secure the rack 30, a hole of the mating portion 56 may align with a hole 64A of the mounting plate 40 so that a fastener 74 may extend through the mating portion 56 into the hole 64A of the mounting plate 40. Thus, it is envisioned that a plurality of rotary bracket mounting holes 64A along the mounting plate 40 may be associated with the various mounting locations of the rack 30. For example, the stowed position and the extended position may each include a mounting hole 64A on the mounting plate 40 to allow for the rotary bracket 52 to be secured in various positions along the mounting plate 40 by rotating the rack 30 in a direction (R), as shown in FIGS. 5 and 6.

To aid in maintaining the position of the rack 30 in a stowed position as shown in FIG. 5, the mounting bracket 38 may include an extension having a bumper 62 that supports one or more portions of the rack 30, such as an upright 34, a crossmember 36, or both. Similarly, to aid in maintaining the position of the rack 30 in an upright position as shown in FIG. 6, the mounting plate 40 may include a tab 50 that abuts the mating portion 56 of the rotary bracket 52. The tab 50 may help alleviate stress along a fastener 74 securing the rotary bracket 52 to the mounting plate 40 along with preventing unwanted over-rotation of the rack 30 beyond the extended position.

Figure 7:
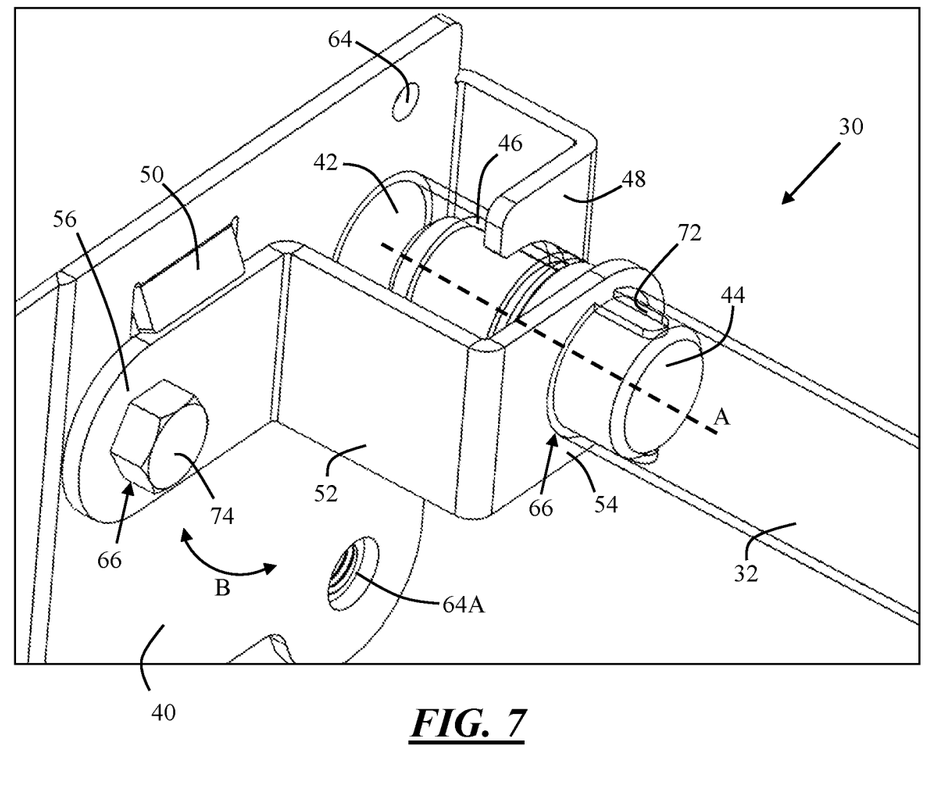
FIG. 7 is a close-up view of a rack in accordance with the present teachings.

FIG. 7 is a close-up view of a rack 30 in accordance with the present teachings. More particularly, a close-up view of a mounting bracket 38 of a rack 30 is shown.

As discussed above, the mounting bracket 38 may include a mounting plate 40 adapted to abut an inner panel of a cargo box of a vehicle to secure the rack 30 to the inner panel by extending one or more fasteners (not shown) through mounting holes 64 of the mounting plate 40 into the inner panel (see FIGS. 3-5). Once secured, the mounting bracket 38 may in part allow for rotation of the rack 30 to move the rack 30 between an extended position and a stowed position. In particular, a rotary member 32 of the rack 30 may rotate in conjunction with a rotary bracket 52 connected thereto in a direction (B).

To allow for such rotation of the rotary member 32 and the rotary bracket 52, the rotary bracket 52 may include a connecting portion 54 that abuts an end of the rotary member 52. A barrel 44 extending from within a sleeve 42 of the mounting bracket 38 extends through a hole 66 of the rotary bracket 52 and received within a cavity of the rotary member 32. It should be noted that FIG. 7 illustrates the barrel 42 and the rotary member 32 in a transparent manner to provide further clarity. It is also envisioned that the rotary bracket 54 and the barrel 44 are in a press-fit condition or are otherwise secured to one another so that rotation of the barrel 44 along an axis (A) of the barrel 44 also rotates the rotary bracket 52 in the direction (B). Similarly, the barrel 44 is secured within the rotary member 32 of the rack 30 so that rotation of the rotary member 32 along the axis (A) of the barrel 44 also rotates the barrel 44 along the axis (A). The rotary member 32 may also include a notch 72 that aids in insertion of the barrel 44 into the rotary member 32. Similarly, the notch 72 may act as a keying feature so align with a key along the barrel 44, the rotary member 32, or both to properly align all components for installation purposes. Additionally, to create such rotation of the rotary member 32, the barrel 44, and the rotary bracket 52 relative to the mounting plate 40, the barrel 44 may be seated within a bearing 46 of the sleeve 42 to allow rotation of the barrel 44 relative to the sleeve 42. Furthermore, the sleeve 42 may also be supported by a support 48 extending from the mounting plate 40.

During rotation of the rotary member 32 in the direction (B), the rotary bracket 52 may so that a mating portion 56 of the rotary bracket 52 is guided along a surface of the mounting plate 40. The mating portion 56 may move between a plurality of rotary bracket mounting holes 64A located along the mounting plate 40. As discussed above, the rotary bracket mounting holes 64A may correlate to the mounting positions of the rack 30. For example, a first rotary bracket mounting hole may correlate to an extended position of the rack 30 while a second rotary bracket mounting hole may correlate to a stowed position of the rack 30. To secure the rack 30 in a desired position, the rotary member 32 may be rotated to rotate the rotary bracket 52 and align a rotary bracket hole 66 on the mating portion 56 with a rotary bracket mounting hole 64A on the mounting plate 40. Once aligned, a fastener 74 may extend through the rotary bracket hole 66 and into the rotary bracket mounting hole 64A on the mounting plate. Additionally, a nut may be welded or secured to an opposing side of the mounting plate 40 to receive the fastener 74.

Beneficially, to move the rack 30 between various locations (e.g., extended position, stowed position, or one or more positions therebetween), a user may simply remove the fastener 74, move the rotary member 32 to rotate the rotary bracket 52 and align the hole 66 of the rotary bracket with another rotary bracket mounting hole 64A of the mounting plate 40, and resecure the fastener 74. Additionally, the mounting plate 40 may also include a tab 50 that helps prevent unwanted movement of the rotary bracket 52 beyond a desired position, such as the extended position.

ELEMENT LIST

10 Vehicle
12 Cargo Box
14 Tailgate
16 Inner Panel of the Cargo Box
18 Top Edge of the Cargo Box
20 Inside of the Cargo Box
22 Stake Pocket of the Cargo Box
24 Fender
26 Tonneau Cover
28 Panel of the Tonneau Cover
28A Front Panel
30 Rack
32 Rotary Member
34 Upright
36 Crossmember
38 Mounting Bracket
38A Driver Side Mounting Bracket
38B Passenger Side Mounting Bracket
40 Mounting Plate
42 Sleeve
44 Barrel
46 Bearing
48 Support
50 Tab
52 Rotary Bracket
54 Connecting Portion
56 Mating Portion
60 Extension of the Mounting Bracket
62 Bumper
64 Mounting Hole of the Mounting Bracket
64A Rotary Bracket Mounting Hole
66 Rotary Bracket Hole
68 Nut
70 Mounting Bracket Fastener
72 Notch
74 Rotary Bracket Fastener
R Direction of Rotation of the Rack
B Direction of Rotation of the Rotary Bracket
A Axis of the Barrel The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The disclosures of all articles and references, including patent applications and publications, are incorporated by reference herein in their entirety for all purposes. Other combinations are also possible as will be gleaned from the following claims, which are also hereby incorporated by reference herein in their entirety into this written description.

What is claimed is:

1. A rack comprising:
one or more uprights connected to one or more cross members; a rotary member; and a mounting bracket, the one or more uprights extend from the rotary member, which is configured to be operatively connected to the mounting bracket, the mounting bracket is configured to attach to a cargo box of a vehicle,
wherein the rotary member is configured to rotate relative to the mounting bracket to move the rack between an extended position where at least part of the rack extends beyond a top edge of the cargo box and a stowed position where at least part of the rack is positioned below the top edge of the cargo box;
wherein in the stowed position, the one or more uprights, the one or more crossmembers, or a combination thereof are supported by an extension that is attached to the cargo box.

2. The rack of claim 1, wherein, when the rack is in the stowed position, the rack is positioned within the cargo box so that a tonneau cover can be disposed over the cargo box along the top edge.

3. The rack of claim 1, wherein the mounting bracket is adapted to mount the rack to an inner panel or wall of the cargo box below the top edge.

4. The rack of claim 3, wherein the mounting bracket includes a mounting plate that is adapted to abut the inner panel or wall of the cargo box so that a fastener may extend through the mounting plate and into the inner panel or wall.

5. The rack of claim 4, wherein the mounting bracket is free of contact with a stake pocket located along the top edge of the cargo box.

6. The rack of claim 4, wherein the mounting plate includes the extension that supports a portion of the rack when in the stowed position.

7. The rack of claim 6, wherein the extension includes a bumper that contacts the portion of the rack when in the stowed position.

8. The rack of claim 3, wherein a barrel extends between the rotary member and a sleeve of the mounting bracket, and a bearing within the sleeve allows for rotation of the barrel and the rotary member relative to the sleeve.

9. The rack of claim 8, wherein the sleeve is at least partially supported by a support extending from a mounting plate of the mounting bracket.

10. The rack of claim 8, wherein a rotary bracket abuts the rotary member and rotation of the rotary member moves the rotary bracket.

11. The rack of claim 10, wherein the barrel is secured within the sleeve of the mounting bracket, extends through the rotary bracket, and/or extends into the rotary member.

12. The rack of claim 11, wherein the rotary member and the barrel rotate about a longitudinal axis of the barrel.

13. The rack of claim 10, wherein the rotary bracket includes a connecting portion secured to the rotary member and a mating portion that is guided along a mounting plate of the mounting bracket.

14. The rack of claim 13, wherein the mating portion is moved between rotary bracket mounting holes located on the mounting plate, and a fastener is configured to extend through the mating portion into one of the rotary bracket mounting holes.

15. The rack of claim 14, wherein a first rotary bracket mounting hole corresponds to the stowed position of the rack and a second rotary bracket mounting hole corresponds to the extended position of the rack.

16. The rack of claim 15, wherein the mating portion of the rotary bracket abuts a tab of the mounting plate when the rack is in the extended position.

17. A rack comprising:
one or more uprights connected to one or more cross members; a rotary member; and a mounting bracket, the one or more uprights extend from the rotary member, which is configured to be operatively connected to the mounting bracket, the mounting bracket is configured to attach to a cargo box of a vehicle;

wherein the rotary member is configured to rotate relative to the mounting bracket to move the rack between an extended position where at least part of the rack extends beyond a top edge of the cargo box and a stowed position where at least part of the rack is positioned below the top edge of the cargo box;

wherein the mounting bracket includes an extension; and in the stowed position, the one or more uprights, the one or more crossmembers, or a combination thereof are supported by the extension.

18. The rack of claim 17, wherein the rack comprises a barrel that extends between the rotary member and the mounting bracket, the barrel is received within a cavity of the rotary member.

19. The rack of claim 18, wherein the rotary bracket is configured to abut a tab of the mounting plate when the rack is in the extended position.

20. A rack comprising:
a mounting bracket adapted to mount the rack to an inner wall or panel of a cargo box of a vehicle;
a rotary member operatively connected to the mounting bracket;
wherein the rotary member is configured to rotate relative to the mounting bracket to move the rack between an extended position where at least part of the rack extends above a top edge of the cargo box and a stowed position where at least part of the rack is below the top edge of the cargo box;
wherein a rotary bracket abuts the rotary member, and rotation of the rotary member moves the rotary bracket.

21. The rack of claim 20, wherein the rack comprises a barrel that extends between the rotary member and the mounting bracket, the barrel is received within a cavity of the rotary member.

22. The rack of claim 21, wherein the rotary bracket is configured to abut a tab of the mounting plate when the rack is in the extended position.

* * * * *